United States Patent
Todd et al.

(10) Patent No.: US 9,449,087 B2
(45) Date of Patent: *Sep. 20, 2016

(54) SYSTEM AND METHOD FOR VIDEOCONFERENCING AND TELEPRESCENCE QUALITY ANALYTICS

(75) Inventors: Marc A. Todd, Foxboro, MA (US);
Peter S. Dawson, Westwood, MA (US);
Lynn M. Birch, Mansfield, MA (US);
Balaji Ramamoorthy, Mansfield, MA (US)

(73) Assignee: IneoQuest Technologies, Inc., Mansfield, MA (US)

( * ) Notice: Subject to any disclaimer, the term of this patent is extended or adjusted under 35 U.S.C. 154(b) by 915 days.

This patent is subject to a terminal disclaimer.

(21) Appl. No.: 13/404,401

(22) Filed: Feb. 24, 2012

(65) Prior Publication Data

US 2012/0154515 A1    Jun. 21, 2012

Related U.S. Application Data

(63) Continuation of application No. 12/619,240, filed on Nov. 16, 2009.

(60) Provisional application No. 61/229,851, filed on Jul. 30, 2009.

(51) Int. Cl.
*H04N 21/475*    (2011.01)
*G06F 17/30*    (2006.01)
*G06Q 30/02*    (2012.01)

(52) U.S. Cl.
CPC ......... *G06F 17/30781* (2013.01); *G06Q 30/02* (2013.01); *H04N 21/4756* (2013.01)

(58) Field of Classification Search
None
See application file for complete search history.

(56) References Cited

U.S. PATENT DOCUMENTS 6,944,585 B1    9/2005    Pawson
7,114,174 B1    9/2006    Brooks et al.
(Continued)

OTHER PUBLICATIONS

Hartanto, et al., "Cumulative Inter-ADU Jitter Concept and Its Applications", 2001, pp. 531-534, Dept. of Information Engineering, The Chinese University of Hong Kong, Shatin, NT, Hong Kong; Dept. of Electrical and Electronic Engineering, University of Canterbury, Christchurch, New Zealand.
Notice of Allowance issued in related U.S. Appl. No. 12/619,240.
Final Office Action issued in corresponding U.S. Appl. No. 12/619,240 on Feb. 27, 2015, pp. 1-12.
(Continued)

*Primary Examiner* — Mark D Featherstone
(74) *Attorney, Agent, or Firm* — Jeffrey T. Placker; Michael T. Abramson; Holland & Knight LLP (57) ABSTRACT

Video content information associated with video content is received, by at least a first computing device, wherein the video content includes one or more video conferences and the first computing device includes a software module configured, at least in part, to access the video conferences. End destination information associated with a reception instance of the video content is received, wherein the end destination information includes experience information that, at least in part, includes information relating to a quality of the reception instance of the video content and a location of an end destination associated with the reception instance of the video content. At least a portion of the video content information and the end destination information is selectively aggregated, by another computing device, which includes at least a portion of the information relating to the quality of the reception instance of the video content, to generate aggregated information.

24 Claims, 8 Drawing Sheets

(56) References Cited

U.S. PATENT DOCUMENTS

| | | | |
|---|---|---|---|
| 7,296,284 | B1 | 11/2007 | Price et al. |
| 7,555,006 | B2 | 6/2009 | Wolfe et al. |
| 7,614,075 | B2 | 11/2009 | McDowell et al. |
| 7,617,516 | B2 | 11/2009 | Huslak et al. |
| 7,624,412 | B2 | 11/2009 | McEvilly et al. |
| 7,720,023 | B2 | 5/2010 | Bais et al. |
| 7,814,513 | B2 | 10/2010 | Sarukkai et al. |
| 8,019,896 | B2 | 9/2011 | Todd et al. |
| 8,587,630 | B1* | 11/2013 | Krinsky et al. ............ 348/14.02 |
| 2006/0018266 | A1 | 1/2006 | Seo |
| 2006/0072593 | A1* | 4/2006 | Grippo et al. ................ 370/409 |
| 2007/0186234 | A1* | 8/2007 | Cormack et al. ............... 725/28 |
| 2008/0060013 | A1* | 3/2008 | Sarukkai et al. ............... 725/46 |
| 2008/0198785 | A1 | 8/2008 | Huang et al. |
| 2009/0094286 | A1 | 4/2009 | Lee et al. |
| 2009/0282438 | A1 | 11/2009 | White |
| 2009/0300688 | A1 | 12/2009 | Karaoguz et al. |
| 2010/0043020 | A1 | 2/2010 | Basso et al. |
| 2011/0029639 | A1 | 2/2011 | Todd et al. |
| 2011/0030022 | A1 | 2/2011 | Todd et al. |
| 2012/0154602 | A1 | 6/2012 | Todd et al. |
| 2012/0159560 | A1 | 6/2012 | Todd et al. |
| 2012/0159561 | A1 | 6/2012 | Todd et al. |

OTHER PUBLICATIONS

Non-Final Office Action issued in corresponding U.S. Appl. No. 12/619,240 on Mar. 16, 2012, pp. 1-13.
Final Office Action issued in corresponding U.S. Appl. No. 12/619,240 on Nov. 12, 2012, pp. -10.
Non-Final Office Action issued in U.S. Appl. No. 12/619,240 on Sep. 18, 2014, pp. 1-16.
Non-Final Office Action issued in corresponding U.S. Appl. No. 12/619,120 on Dec. 8, 2010, pp. 1-7.
NFOA Issued in corresponding U.S. Appl. No. 13/404,329, on Mar. 25, 2015, pp. 1-29.
Final Office Action Issued in corresponding U.S. Appl. No. 13/404,329, on Jul. 14, 2015, pp. 1-21.
Final Office Action Issued in corresponding U.S. Appl. No. 13/404,486, on Jul. 13, 2015, pp. 1-21.
Non-Final Office Action Issued in corresponding U.S. Appl. No. 13/404,486, on Apr. 1, 2015, pp. 1-29.
Final Office Action Issued in corresponding U.S. Appl. No. 13/404,561, Jul. 10, 2015, pp. 1-21.
Non-Final Office Action Issued in corresponding U.S. Appl. No. 13/404,561, on May 24, 2015, pp. 1-29.

* cited by examiner

SYSTEM AND METHOD FOR VIDEOCONFERENCING AND TELEPRESCENCE QUALITY ANALYTICS

RELATED APPLICATIONS

The subject application is a continuation application of U.S. application Ser. No. 12/619,240, filed 16 Nov. 2009, which claims the benefit of U.S. Provisional Application Ser. No. 61/229,851, filed 30 Jul. 2009. The entire disclosure of all of the preceding applications are herein incorporated by reference.

FIELD OF THE DISCLOSURE

The present disclosure generally relates to video systems, and more particularly to the gathering and reporting of video content information.

BACKGROUND

In an information-based society, the rate at which information is received and disseminated may prove crucial with respect to the value of that information. The value of this information may be even more greatly impacted in sectors in which the decisions being made that are associated with the data are highly dependent upon the freshness of such information.

For example, advertisers have limited advertising budgets and choose which television/radio stations to advertise on based upon the ratings of that particular television/radio station. Unfortunately, the information provided to the advertisers that is used to make such advertising determinations may be stale. For example, rating information is typically presented in ratings books, which are often only compiled and released every three months. Accordingly, this may result in decisions being made based upon aged data that may have since changed considerably.

SUMMARY OF THE DISCLOSURE

According to a first implementation, a computer implemented method includes accessing, on a computing device, aggregated information including video content information associated with video content and related end destination information. The method also includes processing the aggregated information to render at least a portion of the aggregated information on a publically-accessible information medium, thus generating published content.

One or more of the following features may be included. The video content information may include one or more of a video content identifier and a service provider identifier. The end destination information may include an end destination location identifier associated with a reception instance of the video content. The end destination may include a time identifier associated with the reception instance of the video content. The end destination may additionally/alternatively include an experience information associated with the reception instance of the video content. The experience information may include one or more of: information relating to a quality of the reception instance of the video content; and a user created comment concerning one or more of the video content and the reception instance of the video content.

The aggregated information may concern a plurality of viewers viewing the video content at a plurality of end destinations. The published content may include a graphical representation of a viewing area encompassing the plurality of end destinations including indicia indicative of at least a portion of the end destination information. The viewing area may be chosen from one or more of, at least a portion of a town; at least a portion of a city; at least a portion of a county; at least a portion of a state; at least a portion of a multi-state region; and at least a portion of a country.

The aggregated information may concern a plurality of viewers viewing the video content at a plurality of end destinations. The published content may include a social networking space including indicia indicative of at least a portion of the end destination information. The indicia may include one or more of text-based indicia; graphic-based indicia; audio-based indicia; and video-based indicia.

According to another implementation, a computer program product includes a computer readable medium having instructions stored thereon. When executed by a processor, the instruction cause the processor to perform operations including accessing, on a computing device, aggregated information including video content information associated with video content and related end destination information. The instructions may also cause the processor to process the aggregated information to render at least a portion of the aggregated information on a publically-accessible information medium, thus generating published content.

One or more of the following features may be included. The video content information may include one or more of a video content identifier and a service provider identifier. The end destination information may include one or more of: a end destination location identifier associated with a reception instance of the video content; a time identifier associated with the reception instance of the video content; and an experience information associated with the reception instance of the video content. The experience information may include one or more of: information relating to a quality of the reception instance of the video content; and a user created comment concerning one or more of the video content and the reception instance of the video content.

The aggregated information may concern a plurality of viewers viewing the video content at a plurality of end destinations. The published content may include a graphical representation of a viewing area encompassing the plurality of end destinations including indicia indicative of at least a portion of the end destination information. The viewing area may be chosen from one or more of, at least a portion of a town; at least a portion of a city; at least a portion of a county; at least a portion of a state; at least a portion of a multi-state region; and at least a portion of a country.

The aggregated information may concern a plurality of viewers viewing the video content at a plurality of end destinations. The published content may include a social networking space including indicia indicative of at least a portion of the end destination information. The indicia may include one or more of text-based indicia; graphic-based indicia; audio-based indicia; and video-based indicia.

According to another implementation, a system includes a processor and a memory coupled with the processor. A first software module is executable by the processor and the memory. The first software module is configured to access, on a computing device, aggregated information including video content information associated with video content and related end destination information. A second software module is executable by the processor and the memory. The second software module is configured to process the aggregated information to render at least a portion of the aggregated information on a publically-accessible information medium, thus generating published content.

One or more of the following features may be included. The video content information may include one or more of a video content identifier and a service provider identifier. The end destination information may include one or more of: a end destination location identifier associated with a reception instance of the video content; a time identifier associated with the reception instance of the video content; and an experience information associated with the reception instance of the video content. The experience information may include one or more of: information relating to a quality of the reception instance of the video content; and a user created comment concerning one or more of the video content and the reception instance of the video content.

The aggregated information may concern a plurality of viewers viewing the video content at a plurality of end destinations. The published content may include a graphical representation of a viewing area encompassing the plurality of end destinations including indicia indicative of at least a portion of the end destination information. The viewing area may be chosen from one or more of, at least a portion of a town; at least a portion of a city; at least a portion of a county; at least a portion of a state; at least a portion of a multi-state region; and at least a portion of a country.

The aggregated information may concern a plurality of viewers viewing the video content at a plurality of end destinations. The published content may include a social networking space including indicia indicative of at least a portion of the end destination information. The indicia may include one or more of text-based indicia; graphic-based indicia; audio-based indicia; and video-based indicia.

The details of one or more implementations are set forth in the accompanying drawings and the description below. Other features and advantages will become apparent from the description, the drawings, and the claims.

DETAILED DESCRIPTION OF THE DISCLOSURE

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium include a computer-readable storage medium, which may be, for example, but is not limited to, an electronic, magnetic, optical, electromagnetic, infrared, or semiconductor system, apparatus, a device, or any suitable combination of the foregoing. Exemplary computer readable storage medium may include, but is not limited to, a portable computer diskette, a hard disk, a solid state disc drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any medium that can contain, or store a program for use by or in connection with an instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on a single computing device, e.g., as a stand-alone software package, and or may be at least partly executed on multiple computing devices that may be remote to one another. In the latter scenario, remote computing devices may be connected to one another through a local area network (LAN) or a wide area network (WAN), or the connection may be made to one or more remote computing devices (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
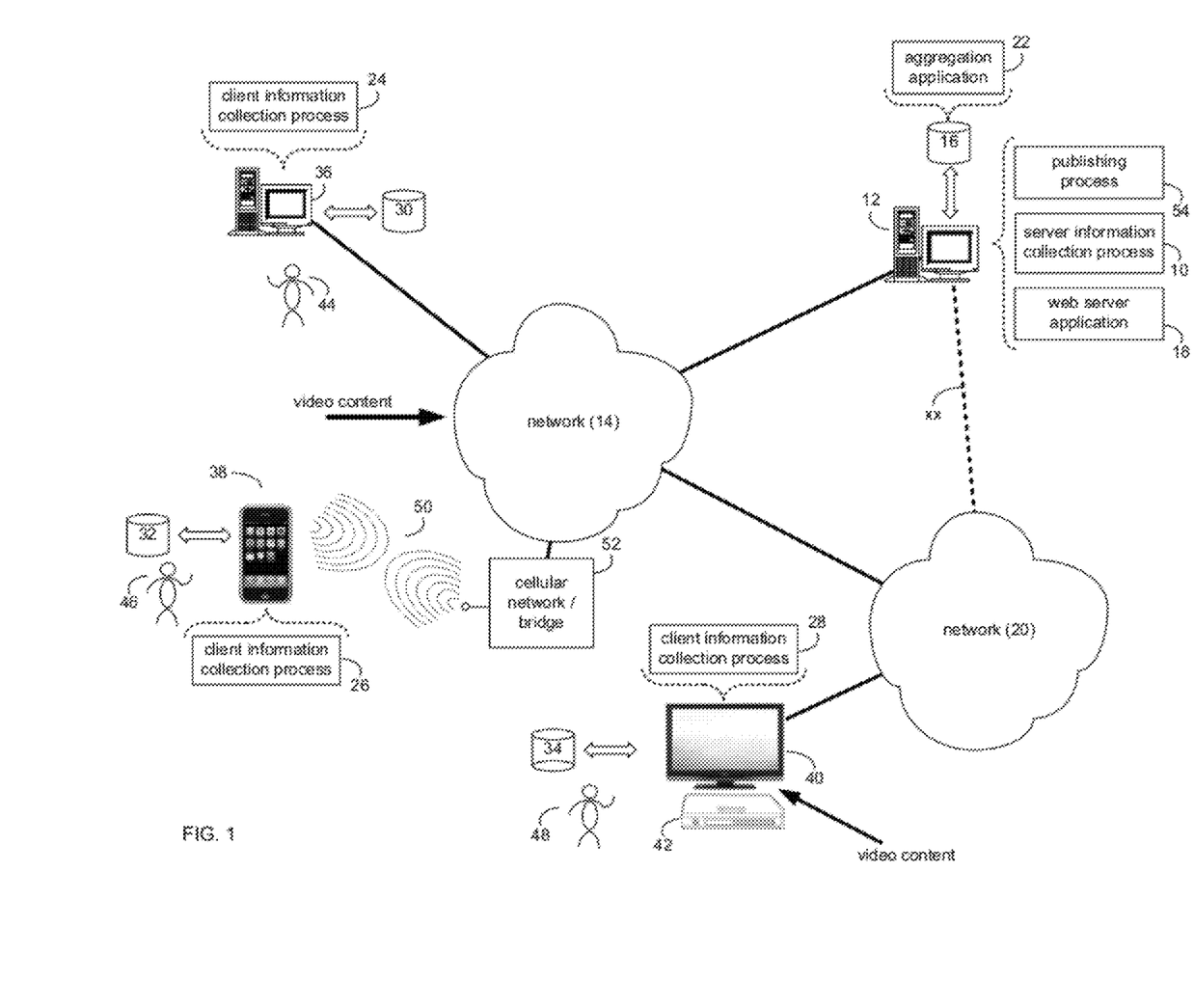
FIG. 1 diagrammatically depicts a publishing process and an information collection process coupled to a distributed computing network.

Referring to FIG. 1, there is shown server information sharing process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® NetWare®; or Red Hat® Linux®, for example (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both), for example.

As will be discussed below in greater detail, server information sharing process 10 may receive, by a computing device, video content information associated with video content. Server information sharing process 10 may also receive, by the computing device, end destination information associated with a reception instance of the video content. Server information sharing process 10 may selectively aggregate at least a portion of the video content information and at least a portion of the end destination information to generate aggregated information.

The instruction sets and subroutines of server information sharing process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute web server application 18, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both), hosting of one or more web pages and/or web sites, and the like. Network 14 may be connected to one or more secondary networks (e.g., network 20), examples of which may include but are not limited to: a local area network; a wide area network; or an intranet, for example.

Server information collection process 10 (alone, or in combination with one or more of web server application 18 and aggregation application 22) may receive video content information messages and/or end destination information messages from one or more client information collection processes (e.g., client information collection processes 24, 26, 28). Aggregation application 22 may include a data storage and management application, for example, but not limited to, a database application such as SQL Server™ MySQL™, and Oracle™ database applications. Additionally, server information collection process 10 (alone, or in combination with one or more of web server application 18 and aggregation application 22) may provide information based upon, at least in part, the video content information and/or the end destination information, e.g., via a web page or collection of web pages. Server information collection process 10 may be a standalone application. Additionally/alternatively, server information collection process 10 may interact with web server application 18 and/or may be incorporated into web server application 18 as a module or component of web server application.

The instruction sets and subroutines of client information collection processes 24, 26, 28, (which may include one or more software modules) which may be stored on storage devices 30, 32, 34 (respectively) coupled to computing devices 36, 38, 40/42 (respectively), may be executed by one or more processors (not shown) and one or more memory modules (not shown) incorporated into computing devices 36, 38, 40/42 (respectively). Storage devices 30, 32, 34 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Computing devices 36, 38, 40/42 may include, be associated with, and/or incorporated into one or more video delivery devices. Examples of computing devices 36, 38, 40/42 may include, but are not limited to, personal computer 36, mobile media device 38 (which may include, but is not limited to, a portable media player, multi-media capable cellular telephone, a portable video game device, and the like), and television 40 and/or television set-top box 42. Computing devices 36, 38, 40/42 may be capable of being connected to a data network (e.g., network 14, network 20).

Using computing devices 36, 38, 40/42 (and/or a video delivery device associated with computing devices 36, 38, 40/42) users 44, 46, 48 consume video content. For example, using personal computer 36, user 44 may consume video content in the form of video included on a web page (e.g., embedded streaming video, webcasts, podcasts, and the like), video content stored on storage device 30, internet protocol television, internet based video on demand (e.g., Hulu™), or the like. Similarly, using mobile media device 38, user 46 may consume video content included on a web page, video content stored on storage device 30, internet based video on deman, or the like. User 48, via television 40 and/or television set-top box 42, may consume television broadcast video content (e.g., airwave broadcast delivery, cable based delivery, satellite based delivery, or the like), video on demand video content, and the like. It will be appreciated that various additional/alternative video content may be consumed via the exemplary devices and/or via other video delivery devices that will be appreciated by those having skill in the art.

The various computing devices may be capable of being directly or indirectly coupled to network 14 (or network 20). For example, personal computer 36 is shown directly coupled to network 14 via a hardwired network connection. Similarly, a personal computer (such as a laptop computer) may be wirelessly coupled to network 14 (or network 20) via a wireless communication channel established between the laptop computer and a wireless access point (i.e., WAP), which may be coupled to network 14. The WAP may be, for example, an IEEE 802.11a, 802.11b, 802.11g, Wi-Fi, and/or Bluetooth device that is capable of establishing the wireless communication channel between the laptop computer and the WAP. Mobile media device 38 is shown wirelessly coupled to network 14 via wireless communication channel 50 established between mobile media device 38 and cellular network/bridge 52, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Computing devices 36, 38, 40/42 may each execute an operating system, examples of which may include but are not limited to Microsoft Windows, Microsoft Windows CE®, Red Hat Linux, etc., or a custom operating system (Windows CE is a registered trademark of Microsoft Corporation in the United States, other countries, or both).

Figure 2:
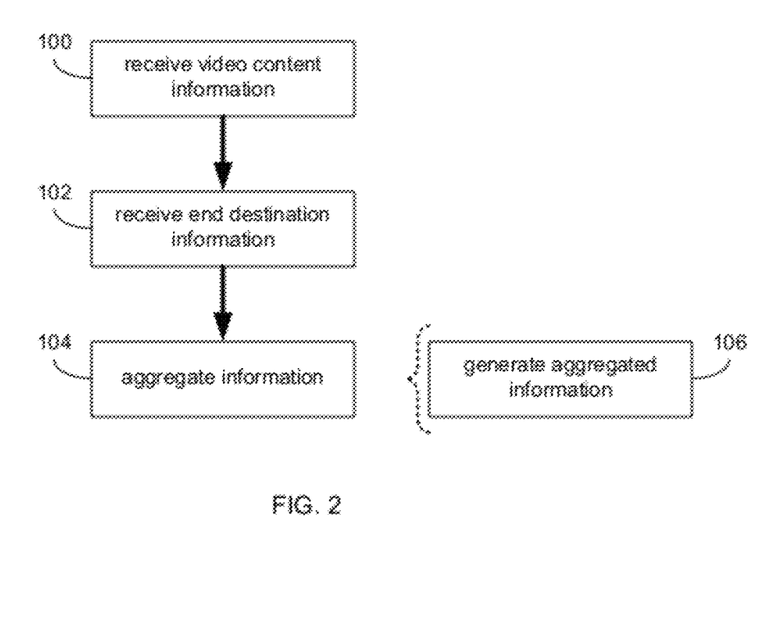
FIG. 2. is a flowchart of a process executed by the information collection process of FIG. 1.
Figure 3:
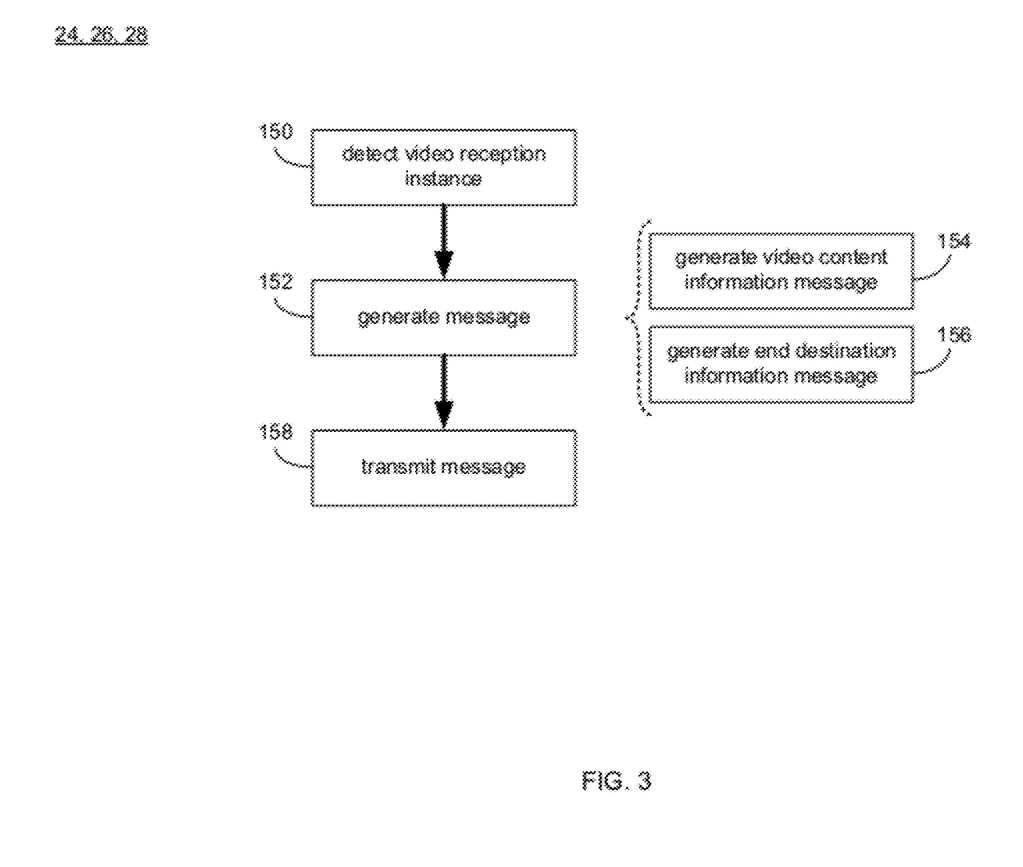
FIG. 3 is a flowchart of a process executed by the information collection process of FIG. 1.

Referring also to FIGS. 2 and 3, server information collection process 10 may generally receive 100 video content information associated with video content. Additionally server information collection process 10 may receive 102 end destination information associated with a reception instance of the video content. Further, server information collection process 10 may selectively aggregate 104 at least a portion of the video content information and at least a portion of the end destination information.

For example, user 48 may consume video content by watch a television broadcast program (e.g., an episode of the television program "30 Rock") via television 40 and/or set-top box 42. The television broadcast program may be provided to television 40/set-top box 42 via a cable transmission provided by Comcast Corporation. The television broadcast program may be provided directly to television 40 and/or to television 40 via set-top box 42, thereby allowing user 48 to watch the episode of "30 Rock." When user 48 selects the program "30 Rock," (e.g., by selecting the television channel currently airing "30 Rock"), client information collection process 28 may detect 150 a video reception instance.

The video reception instance may include, for example, user 48 selecting and actively viewing (e.g., displaying on television 40) the episode of "30 Rock." However, according to system and/or user preferences (e.g., which may be determined by client information collection process 28 and/or set by user 48, e.g., via graphical user interface displayed via television 40) a reception instance may also include, for example, reception of the video content via the cable broadcast transmission and recording to the video content, e.g., by a digital video recorder incorporated into set-top box 42, and/or associated with television 40, without user 48 actively viewing (e.g., displaying on television 40) the video content. Accordingly, the video reception instance may generally include the reception of the video content (e.g., the episode of "30 Rock) by a particular video delivery device (e.g., by television 40/set-top box 42).

Further, assume that user 48 views a live broadcast of the episode of "30 Rock" while simultaneously recording the episode of "30 Rock" (e.g., via a digital video recorder, or the like) being viewed via the live broadcast. User 48's viewing of the live broadcast of the episode of "30 Rock" may be a first reception instance. User 48 may, e.g., at a later time, view the recording of the episode of "30 Rock" (e.g., via the digital video recorder). The subsequent viewing of the recording of the episode of "30 Rock" may be a second reception instance. Similarly, user 48 may view a live broadcast of a re-run of the same episode of "30 rock." The viewing of the re-run of the episode of "30 Rock" may be a third reception instance.

While the video content of the foregoing example may include a television program (e.g., and episode of "30 Rock") delivered via a cable broadcast network (e.g., provided by Comcast Corporation), as discussed previously other video content is also contemplated. For example, the video content may include, but is not limited to, a television broad cast, video on a web page, video on demand products (e.g., provided by a cable service provider, and internet video on demand service, or the like), a video conference, or other video content.

Upon client information collection process 28 detecting 150 a reception instance of video content, client information collection process 28 may generate 152 one or more messages. Client information collection process 28 may generate 152 the one or more messages automatically upon detection 150 of the reception instance. Additionally/alternatively, upon detecting 150 the video reception instance, client information collection process 28 may generate 152 the one or more messages in response to a user input. For example, a remote control device associated with television 40 and/or set-top box 42 may include a button (e.g., a "send information" button) for generating the one or more messages. Upon user 48 pressing the button, client information collection process 28 may receive a signal (e.g., via television 40 and/or set-top box 42) causing client information collection process 28 to generate 152 the one or more messages.

Figure 4:
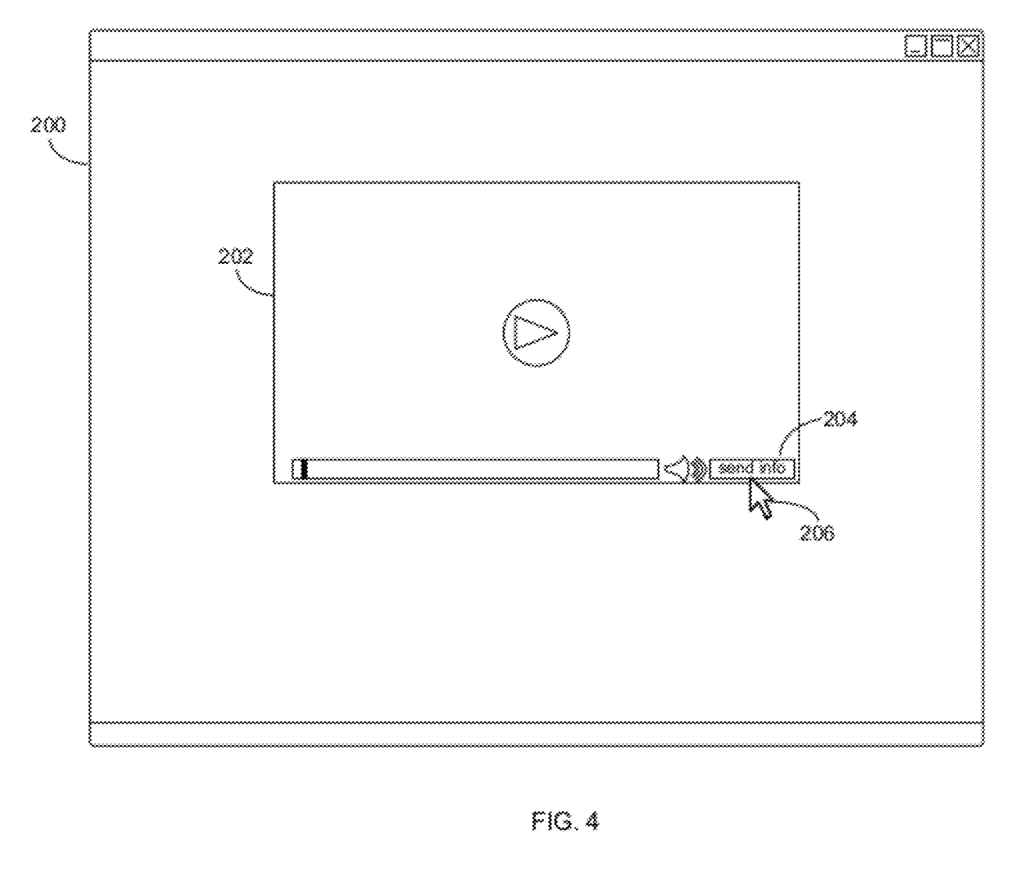
FIG. 4 is a diagrammatic view of a web page including video content.

In various other embodiments, the user may similarly provide an input causing the client information collection process to generate 152 one or more messages. For example, and referring to FIG. 4, user 44 may view a video on a web page (e.g., web page 200). A graphical user interface associated with video display 202 may include "send info" button 204. User 44 may select, via onscreen pointer 206 (which may be controlled by a pointing device such as a mouse; not shown), send info button 204. Selecting send info button 204 may result in client information process 24 generating 152 one or more messages.

Generating 152 the one or more messages may include generating 154 one or more video content messages, including video content information. Further, generating 152 the one or more messages may include generating 156 one or more end destination messages including end destination information associated with a reception instance. While the foregoing describes generating one or more video content messages including video content information and generating one or more end destination messages including end destination information associated with a reception instance, it should be appreciated that generating 152 the one or more messages may include generating a single message including both video content information and end destination information associated with a reception instance.

Generally, video content information may include information that may be intrinsic to the particular piece of video content. As such, video content information may include, for example, the identification of the video content, a service provider identifier associated with the particular transmission of the particular piece of video content. Continuing with the above stated example, assume that user 48 is watching the second episode of the fourth season of "30 Rock," which is airing on Oct. 22, 2009, on NBC channel 7, broadcast by Comcast in Massachusetts. Accordingly, generating 154 one or more video content information messages may include generating a message including one or more of an identifier of the particular piece of video content (e.g., the second episode of the fourth season of "30 Rock" as aired on Oct. 22, 2009) and a service provider identifier (e.g., channel 7, broadcast by Comcast in Massachusetts). Additional/alternative information about the particular piece of content may also be included. In the case of, e.g., video one a web site, video content information may include, for example, a video identifier, the web site from which the video is viewed, an identity of the internet service provider through which the web page including the video content is accessed, etc.

Generally, end destination information associated with the reception instance may include information that may depend upon the consumption of the video content. For example, end destination information associated with the reception instance may include a geographic location of the video delivery device (e.g., which may include and/or be associated with the computing device executing the client information collection process). The geographic location of the video delivery device may be determined based upon, at least in part, one or more of: a user input (e.g., an initial set-up of the client information collection process may request and receive a user input of a location such as an address), a detected location (e.g., based upon an associated GPS receiver, cellular telephone broadcast tower triangulation, Wi-Fi access point location, or the like), and IP address of a network connection (e.g., via which the computing device may be coupled to network 14 or network 20), or the like. Additionally, the end destination information associated with the reception instance may include a start time and a stop time of the reception instance (e.g., start and stop time of viewing of the video content and/or recording of the video content), a time at which the client information collection process generates 152 the message, and indicator of whether the video content is viewed at a time of broadcast or is viewed at a later time (e.g., a recording of the broadcast if viewed), and the like.

Additionally, the end destination information associated with the reception instance may include experience information. Experience information may include information regarding a quality of the reception instance of the video content (e.g., poor/high quality video, disruptions due to latency and lost packets, etc.) and/or information including user created comments relating to the video content and/or the reception instance of the video content. Information regarding the quality of the reception instance of the video content may be generated by the client information collection process based upon detected lost packets, detected latency, and the like. Additionally/alternatively, the client information collection process may allow, and/or prompt, a user to enter a subjective evaluation of the reception instance of the video content. Additionally/alternatively the client information collection process may allow a user to generate comments relating to the video content itself and/or relating to the reception instance of the video content.

Figure 5:
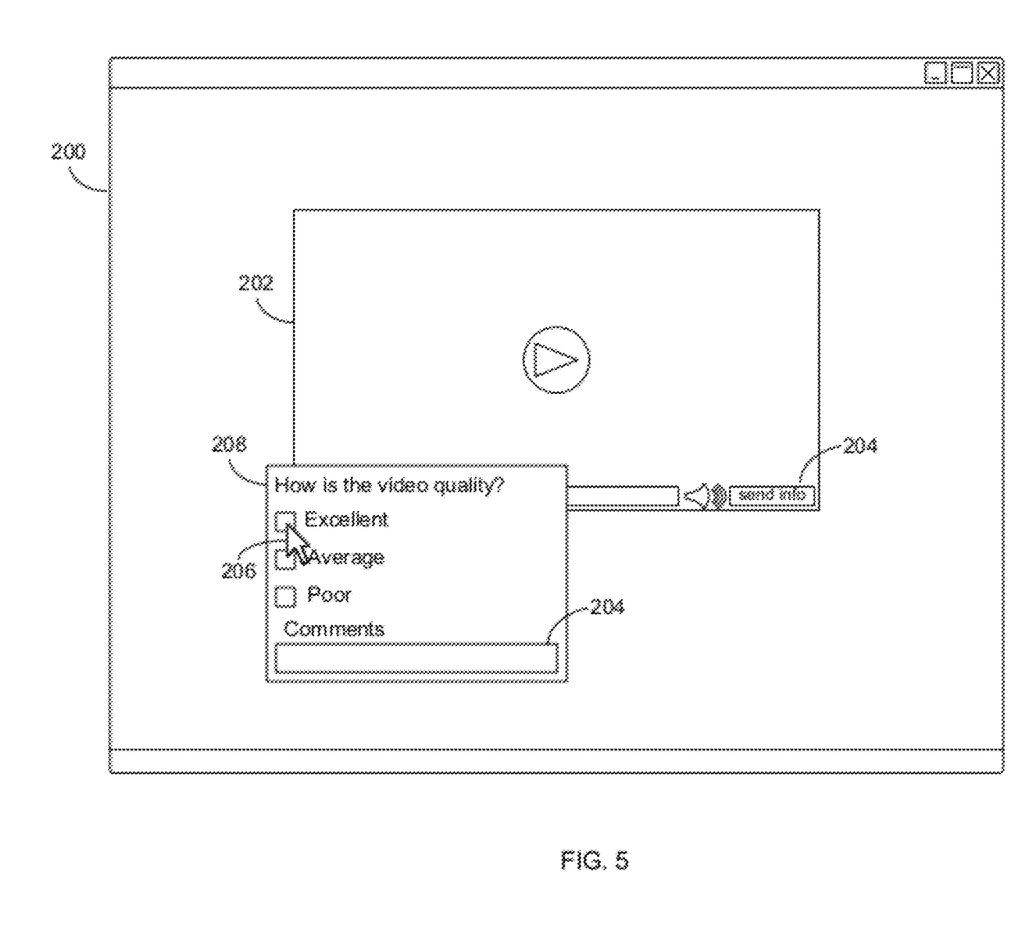
FIG. 5 is a diagrammatic view of a web page including video content.

For example, and referring also to FIG. 5, client information collection process 24 may (alone or in combination with another application, such as a web browser) generate information dialog box 208. While information dialog box 208 is shown including three options (namely, "Excellent," "Average," and "Poor") which may be selected by user 44 (e.g., using on screen pointer 206 controlled by a pointing device) to indicate user 44's subjective opinion of the quality of the reception instance of the video content, this should not be construed as a limitation of the present disclosure, and the number and nature of options may vary according to design criteria and user need. Additionally, information dialog box 208 may include comment block 204. User 44 may input comments (e.g., using a keyboard or other input device, not shown) in comment block 204, relating to the video content (e.g., "this video is hysterical") and/or the reception instance of the video content (e.g., "the video and sound are really out of sync"). Client information collection process 24 may include at least a portion of the experience information (e.g., user 44's video quality selection and user 44's comments) in the one or more generated 152 messages.

Continuing with the above-stated example, user 48 may be viewing a live broadcast of the second episode of the fourth season of "30 Rock" at 9:30 pm on Thursday, Oct. 22, 2009 via television 40 and/or set-top box 42. Client information collection process 28 may generate 156 one or more end destination information messages associated with the reception instance. The generated 156 end destination message may include the geographic location of television 40 and/or set-top box 42 (e.g., 13 Storybook Ln., Boston, Mass., based upon an address input), a start time of the video content (e.g., 9:30 pm EST, on Thursday, Oct. 22, 2009). Additionally, the end destination information associated with the reception instance may include experience information. For example, client information collection process 28 may allow (e.g., via an onscreen display) user 48 to input information concerning the video quality of the reception (e.g., using a remote control device associated with television 40 and/or set-top box 42 and/or an onscreen graphical user interface). For example, assume that while watching the episode of "30 Rock" user 48 notices that the video is not properly synchronized with the audio at several points in the episode. Via an onscreen graphical user interface and using the remote control, user 48 may provide an input (e.g., by selecting from a menu provided via the graphical user interface) indicating that there were some problems with the quality of the video content. Further, user 48 may provide the comment (e.g., again via an onscreen graphical user interface and using the remote control) that the episode is "the funniest episode yet." The generated 156 end destination message may include the experience information input by user 48.

Upon generating 152 the one or more messages, client information collection process 28 may transmit 158 the one or more messages, e.g., to server information collection process 10. Video content information and end destination information may be transmitted 158 as a single message and/or may include one or more discrete messages (e.g., one or more messages for video content information and one or more messages for end destination information, or separate messages for each component, etc.).

The one or more generated 152 messages may be transmitted to server information collection process 10 and/or to web server application 18. The one or more generated messages may include, for example, and HTTP message, e.g., which may be received by web server application 18 and/or server information collection process 10. Various addition and/or alternative message types and/or message formats may be suitably utilized.

As discussed above, and with particular reference to FIG. 2, server information collection process 10 may generally receive 100 video content information associated with video content. Additionally server information collection process 10 may receive 102 end destination information associated with a reception instance of the video content. Further, server information collection process 10 may selectively aggregate 104 at least a portion of the video content information and at least a portion of the end destination information.

Receiving the video content information and receiving the end destination information may include receiving one or more of the video content information and the end destination information from a computing device associated with the reception instance of the video content. As discussed above, a computing device (e.g., which may be included in, and/or associated with, a video delivery device such as personal computer 36, mobile media device 38, television 40 and/or television set-top box 42) may execute a client information collection process (e.g., client information collection process 24, 26, 28), which may transmit 158 one or more messages including video content information and/or end destination information associated with a reception instance, either automatically and/or in response to a user input.

The video content information may include one or more of an identity of the video content and a service provider identifier associated with a transmission of the video content. Continuing with the above-example, server information collection process 10 (alone and/or in conjunction with web server application 18) may receive 100 video content information including video content identification (e.g., the second episode of the fourth season of "30 Rock" that aired at 9:30 pm on Thursday, Oct. 22, 2009). Additionally server information collection process 10 may receive 100 video content information including a service provider identifier associated with a transmission of the video content (e.g., Comcast in Massachusetts). Additional video content information may also be included, such as the channel on which the video content aired (e.g., channel 7), and the like. Additionally, at least a portion of the video content information may be determined by server information collection process 10 (alone and/or in combination with one or more additional applications, e.g., web server application 18). For example, if the episode number was not included in the received 100 video content information, server information collection process 10 may determine the episode number, e.g., based upon a television schedule look-up, or the like.

The end destination information received 102 by server information collection process 10 may include one or more of a location of an end destination associated with the reception instance of the video content, a time associated with the reception instance of the video content, and experience information associated with the reception instance of the video content. For example, and still continuing with the above example, server information collection process 10 may receive end destination information including and end destination for consumption of the video content, namely the geographic location of television 40 and/or set-top box 42 (i.e., 13 Storybook Ln., Boston, Mass.). Additionally, server information collection process 10 may receive a time of 9:30 pm EST associated with the reception instance of user 48 viewing the live airing the of the episode of "30 Rock."

Server information collection process 10 may also receive 102 experience information associated with the reception instance of the video content. The experience information may include information relating to a quality of the reception instance of the video content. For example, in the above-example, user 48 found that at several point the video and audio were poorly synchronized. Accordingly, user 48 provided an input indicating that there were some problems with the quality of the video content. Server information collection process 10 may receive 102 experience information associated with the reception instance of the episode of "30 Rock" indicating that there were some problems with the quality of the video.

The experience information received by server information collection process 10 may include a user created comment relating to one or more of the video content and the reception instance of the video content. Still continuing with the above stated example, server information collection process 10 may receive 102 end destination information including the comment "the funniest episode yet."

Server information collection process 10 (alone, and/or in conjunction with one or more of web server application 18 and aggregation application 22) may also selectively aggregate 104 at least a portion of the video content information and at least a portion of the end destination information to generate 106 aggregated information. Selectively aggregating 104 at least a portion of the video content information and at least a portion of the end destination information may include storing at least a portion of the video content information and at least a portion of the end destination information in a database (e.g., which may include parsing the information into predetermined fields). Information received 100, 102 from many users (e.g., users 44, 46, 48) may be commonly aggregated relative to a single video content and/or relative to a plurality of video content.

Figure 6:
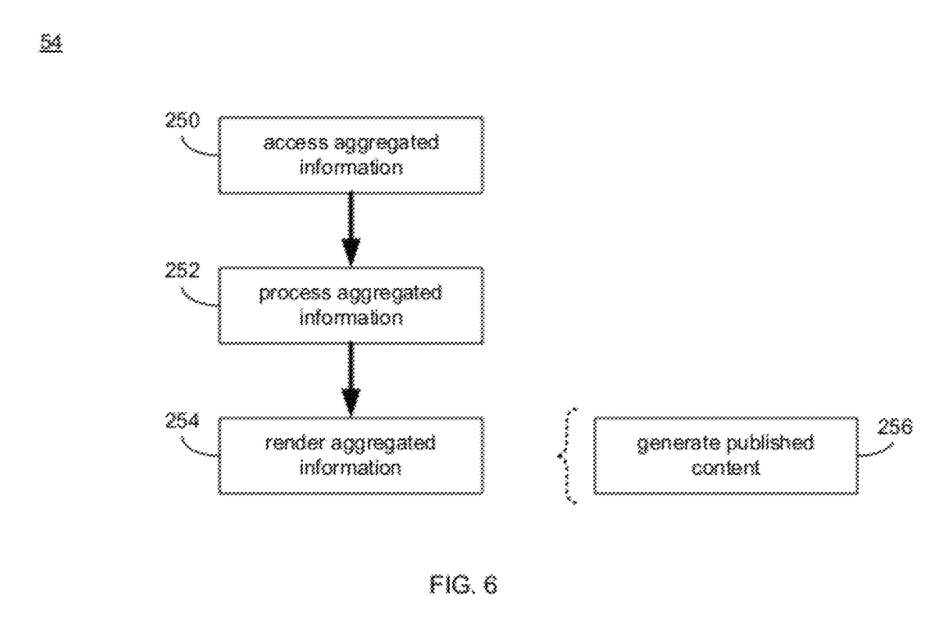
FIG. 6 is a flow chart of a process executed by the publishing process of FIG. 1.

Continuing with the foregoing description, and referring also to FIG. 6, publishing process 54 may reside on and may be executed by server computer 12 (e.g., the instruction sets and subroutines of publishing process 54, which may include one or more software modules, and which may be stored on storage device 16 coupled to server computer 12). Publishing process 54 may include a standalone application, and/or may be a module, component, or the like, of one or more of server information collection process 10, web server application 18, and/or aggregation application 22.

Publishing process 54 may access 250, on a computing device, aggregated information including video content information associated with video content and related end destination information. Publishing process 54 may further process 252 the aggregated information to render 254 at least a portion of the aggregated information on a publically-accessible information medium, thus generating 256 published content.

Publishing process 54 (alone or in combination with one or more of server information collection process 10 and aggregation application 22) may access 250 aggregated data. As discussed above, the aggregated data may be generated, at least in part, by server information collection process 10 (e.g., based upon, at least in part, the received 100 video content information and the received 102 end destination information). As also discussed above, the video content information (e.g., a portion of which may be included in the accessed 250 aggregated information) may include one or more of a video content identifier and a service provider identifier. Continuing with the above-stated example, the video content information may identify the video content as the second episode of the fourth season of "30 Rock" airing on Thursday, Oct. 22, 2009. Similarly, the video content information may identify the service provider as Comcast in Massachusetts. Additional information, such as the channel (e.g., channel 7) on which the video content was viewed may also be included.

The end destination information may include an end destination location identifier associated with a reception instance of the video content. As discussed above, the end destination location identifier associated with a reception instance of the video content may include the geographic location of the video delivery device, via which a user (e.g., user 48) may consume the video content (e.g., 13 Storybook Ln., Boston, Mass. in the above example). As discussed, the location identifier may be based upon an user input location, a detected location (e.g., based upon a GPS receiver associated with the video delivery device, etc.), or the like.

The end destination information may include a time identifier associated with the reception instance of the video content. For example, the time identifier may include a start time of the reception instance (e.g., a time at which a user begins viewing the video content, such as 9:30 pm in the above-example in which the video content is an episode of "30 Rock"). Additionally/alternatively, the time identifier may include a stop time of reception instance. Further, the time identifier may include a time at which a message including end destination information is transmitted (e.g., by a client information collection process). Additional time identifiers may also be included (e.g., representing a time of a commercial or other time-wise attribute associated with the video content and/or the reception instance of the video content).

The end destination may additionally/alternatively include an experience information associated with the reception instance of the video content. The experience information may include information relating to a quality of the reception instance of the video content. For example, the information relating to a quality of the reception instance may be generated by a client information collection process (e.g., client information collection process 24, 26, 28) based upon, at least in part, detected dropped frames, detected latency, or the like. Additionally, the information relating to a quality of the reception instance may be generated based upon, at least in part, a user input, e.g., in response to a user selecting quality identifier via a graphical user interface, or the like.

Further, the experience information associated with the reception instance may include a user created comment concerning one or more of the video content and the reception instance of the video content. For example, a user may input, e.g., via a client information collection process (e.g., client information collection process 24, 26, 28) one or more user created comments about the video content (e.g., user 48 may input the comment "the funniest episode yet," in the above-example). Additionally/alternatively, the experience information associated with the reception instance may include a user created comment concerning the reception instance (e.g., the user may input a comment such as "wow the video is really out of sync with the audio"). The experience information may include one user created comment and/or may include multiple user created comments (e.g., which may be created by the user at various times during the reception instance).

The aggregated information may concern a plurality of viewers viewing the video content at a plurality of end destinations (e.g., which may include a video delivery device that may include and/or be associated with a computing device executing a client information collection process). For example, each of users 44, 46, 48 may watch the same video content (e.g., the above exemplary episode of "30 Rock") from respective locations and/or using respective video delivery devices (e.g., personal computer 36, mobile media device 38, and television 40/set-top box 42). Each viewing of the episode from the respective video delivery devices may constitute a separate reception instance.

The aggregated information may include, at least in part, end destination information associated with each reception instance. Further the end destination information associated with each reception instance may be related, e.g., based upon common video content information. For example, while the end destination information associated with each respective reception instance may be different (e.g., each video delivery device may have a different geographic location, experience different quality, different user created comments), the end destination information of each respective reception instance may be related and/or associated based upon at least partially common video content information (each the various end destination information may all pertain to the same episode of "30 Rock").

Publishing process 54 may render 254 the aggregated information to generate 256 published content. The published content may include a graphical representation of a viewing area encompassing the plurality of end destinations including indicia indicative of at least a portion of the end destination information. The viewing area may be chosen from one or more of, at least a portion of a town; at least a portion of a city; at least a portion of a county; at least a portion of a state; at least a portion of a multi-state region; and at least a portion of a country.

For example, publishing process 54 (alone, and/or in conjunction with one or more of server information collection process 10, web server application and aggregation application 22) may generate 256 published content by posting it on one or more web pages. The published information may, for example, provide a real-time, near real-time, or historic reporting of user video experiences (e.g., including at least a portion of end destination information associated with the plurality of end destinations). The reporting of user video experiences may include information such as, how many people are watching a specific television shown (e.g., which may be a piece of video content), the top television shows being watched at a given time (e.g., at the time the one or more web pages including the aggregated data are accessed, and/or at a given time in the past). Similarly, the published aggregated information may indicate the number of users experiencing problems with a given piece of video content, a given service provider, etc. Further, the published aggregated information may me configured to provide the aggregated information in a geographically relevant manner. For example, information such as how many people are watching a specific show may be broken up by geographic regions. Similarly, information pertaining to the number of people experiencing problems video problems across one specific piece of video content, across multiple pieces of video content, and/or as between multiple service providers may be reported by geographic region.

Figure 7:
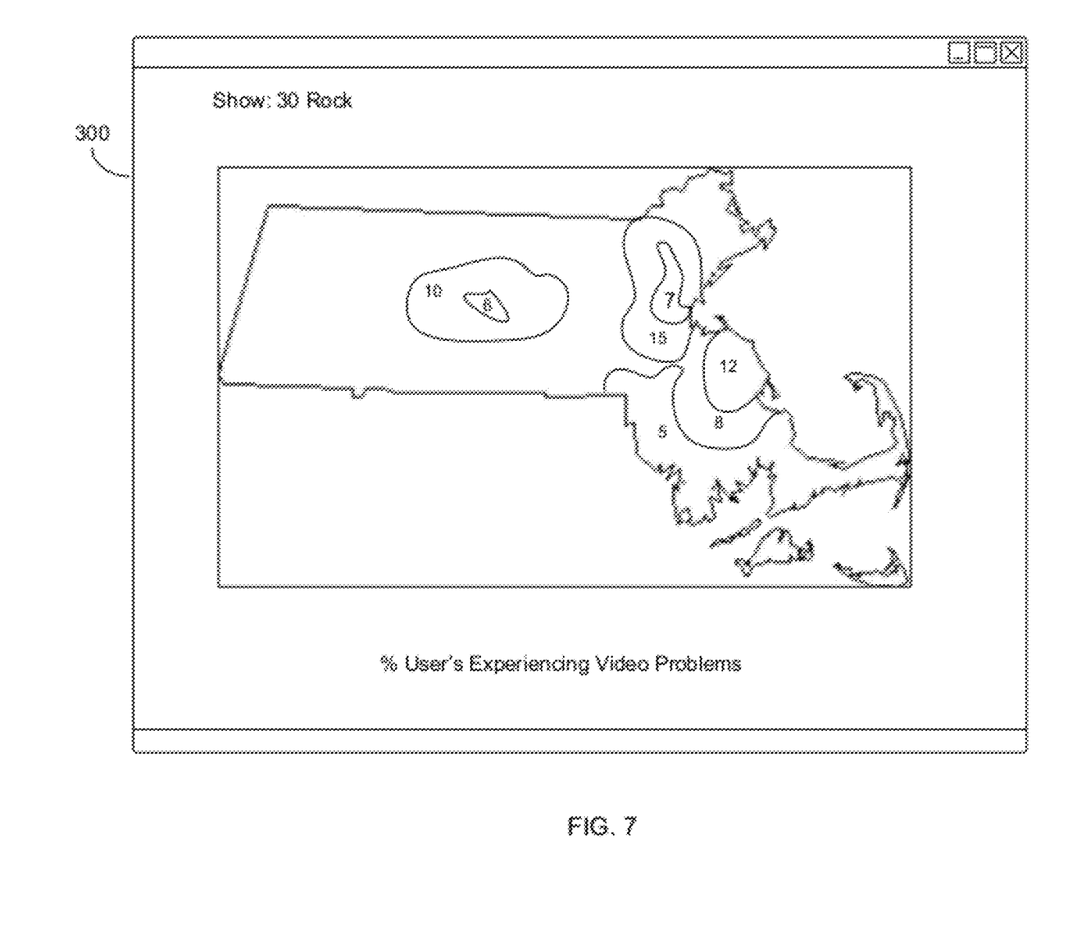
FIG. 7 is a diagrammatic view of a web page including a geographically associated graphic representation of aggregated information generated, at least in part, by the publishing process of FIG. 1.

Generating 256 published content may include generating 256 a geographically associated graphic representation of at least a portion of the aggregated information. For example, and referring also to FIG. 7, the percentage of users watching the episode of "30 Rock" experiencing at least some problem with video may be presented in a geographically associated graphic representation in web page 300, which may be accessed via a web browser. In the example of FIG. 7, the viewing area depicted is the state of Massachusetts. However, as described above, different viewing areas may be selected (e.g., based on a graphical user interface associated with web page 300; not shown), allowing different viewing areas to be graphically represented.

As discussed above, the aggregated information may concern a plurality of viewers viewing the video content at a plurality of end destinations. The published content may include a social networking space including indicia indicative of at least a portion of the end destination information.

The indicia may include one or more of text-based indicia; graphic-based indicia; audio-based indicia; and video-based indicia. For example, in FIG. 7, web page 300 may include a web page of a social networking web site. The social networking web site including web page 300 may be accessible by users (e.g., based upon membership criteria, open access to all users, or other common model).

The aggregated information (e.g., including at least a portion of the end destination information and the video content information associated with a plurality of end destinations) may be leveraged to provide various social networking scenarios, information reporting possibilities, as well as entertainment, etc. For example, viewers of television programs may create user created comments concerning the television program and/or the video issues associated with the television program, or the like. Other views of the television program (as well as people not viewing the television program) may access the social networking web site. The social networking web site may, for example, allow users to review information pertaining to specific television programs to review comments that viewers are making about the television program, to acquire information about video issues that viewers may be having while watching the television program, to acquire information about how many people are watching the television program, and the like. Similarly, and as shown in connection with FIG. 7, users may access the social networking site to acquire information about video issues that viewers may be experiencing in geographic areas, based on service provider, etc.

In one example, the aggregated information may be utilized to allow users to determine what people are watching at a given time (e.g., via a social networking, or other, web site). For example, as discussed above, the aggregated information may include a geographic location associated with each of a plurality of reception instances. Similarly, the aggregated information may include a video content identifier. Further, the aggregated information may include video content information and end destination information relating to a plurality of video content. As the various video content information and end destination information may be received 100, 102 and aggregated in real-time corresponding to reception instances of video content (e.g., as viewers are watching programs), publishing process 54 may be capable of generating 256 real-time published content. Accordingly, publishing process 54 may access 250 aggregated information relating to various video content being consumed at any given point in time, and may be capable of providing time-wise and location-wise relevance to the aggregated information.

Figure 8:
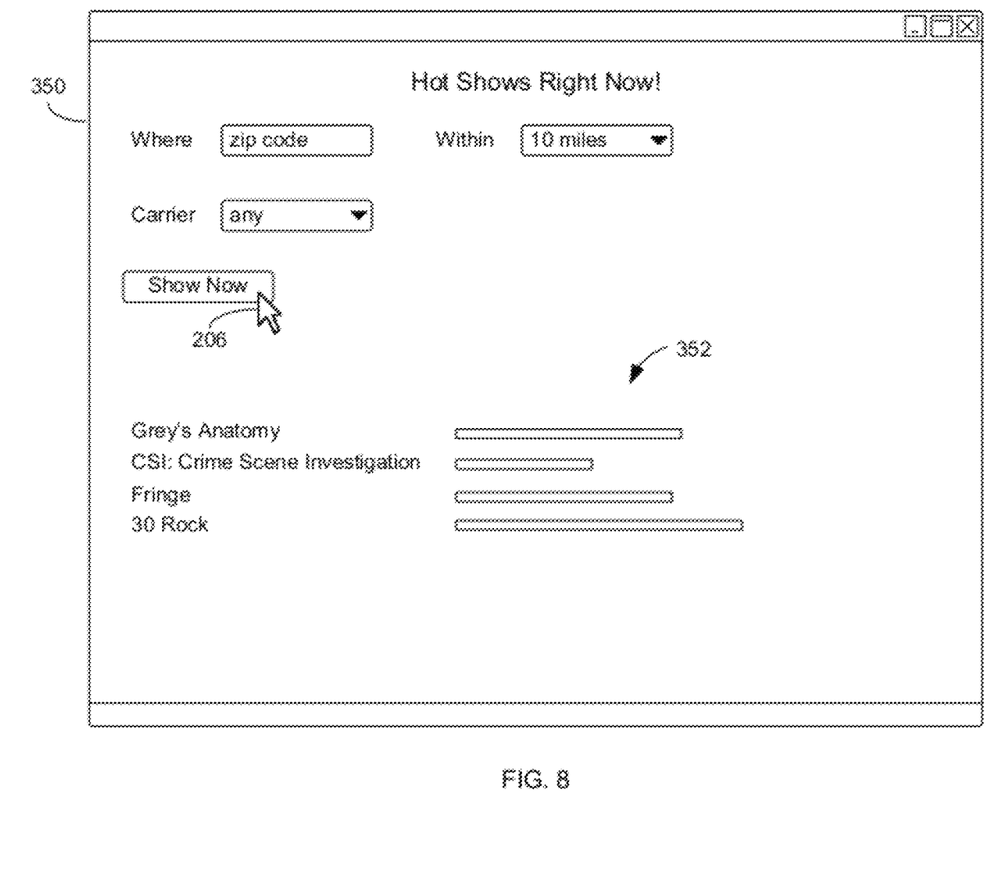
FIG. 8 is a diagrammatic view of a web page generated, at least in part, by the publishing process of FIG. 1.

Referring to FIG. 8, a web page may include published information generated 256, at least in part, by publishing process 54. The generated 256 published content may be based upon, at least in part, search and/or filter criteria provided by a user of web page 350. For example, web page 350 may allow a user to define a desired location (e.g., by inputting a zip code and selecting a desired radius from a drop down menu). Further, web page 350 may allow a user to specify a carrier (e.g., the user may only wish to see what Comcast customers are watching). Upon a user selecting (e.g., via onscreen pointer 206) the "show now" button, publishing process 54 may access 250 aggregated information and may process 252 the aggregated information (e.g., by applying search/filter criteria to the aggregated information based upon, at least in part, the user inputs into web page 350). Further, publishing process 54 may render 254 aggregated information on web page 350 to generate 256 published content (e.g., generally depicted at 352). As shown, the published content may indicate the relative number of people watching various television programs at the time of the search and within the defined geographic location. It will be appreciated that the above example may be implemented in a variety of manners, and as such the illustrated example should not be construed as a limitation of the present disclosure. Additionally, it will be appreciated that various information may be obtained by users of a web site including published content in a manner similar to the examples described above.

Accordingly, information collection process may provide real-time, near real-time, and/or historical reporting of video issues on channels, programs, service providers and the like in geographic regions, as well as registering key view experiences based on one or more of location, channel, program, service provider or the like.

A number of implementations have been described. Nevertheless, it will be understood that various modifications may be made. Accordingly, other implementations are within the scope of the following claims.

What is claimed is:
1. A computer implemented method comprising:
receiving, by at least a first computing device, video content information associated with video content, wherein the video content includes one or more video conferences and the first computing device includes a software module configured, at least in part, to access the one or more video conferences, wherein the video content information includes a service provider identifier;
receiving, by at least the first computing device, end destination information associated with a reception instance of the video content, wherein the end destination information includes experience information that, at least in part, includes information relating to a quality of the reception instance of the video content and a location of an end destination associated with the reception instance of the video content by at least the first computing device used to display the video content, and wherein the received quality of the reception instance of the video content is based upon, at least in part, at least one of detected lost packets and latency associated with the reception instance of the video content by at least the first computing device used to display the video content;
wherein the video content information associated with the video content and the end destination information associated with the reception instance of the video content is received via one or more messages transmitted by at least the first computing device used to display the video content; and
selectively aggregating, by at least a second computing device, at least a portion of the video content information and at least a portion of the end destination information, which includes at least a portion of the information relating to the quality of the reception instance of the video content, to generate aggregated information.

2. The computer implemented method of claim 1, further comprising:
processing the aggregated information to generate one or more reports.

3. The computer implemented method of claim 1 wherein one or more of the first computing device and the second computing device is a mobile media device selected from the group consisting of: a smartphone; a personal media device; a tablet; a personal computer; a mini computer; a laptop; and a personal digital assistant.

4. The computer implemented method of claim 1 wherein the information relating to a quality of the reception instance of the video content includes one or more of:
   detected latency;
   detected lost packets; and
   a user created comment concerning one or more of the video content and the reception instance of the video content.

5. The computer implemented method of claim 1 wherein the video content information further includes a video content identifier.

6. The computer implemented method of claim 1 wherein the location of an end destination associated with the reception instance of the video content includes an end destination location identifier.

7. The computer implemented method of claim 1 wherein the video content information includes a start time and an end time associated with the video content.

8. The computer implemented method of claim 2 wherein the one or more reports are configured to provide the aggregated information in a geographically relevant manner.

9. The computer implemented method of claim 6 wherein the end destination location identifier includes one or more of:
   a user input;
   a detected location; and
   an IP address of a network connection.

10. The computer implemented method of claim 9 wherein the user input includes an address.

11. The computer implemented method of claim 9 wherein the detected location is detected based upon one or more of: an associated GPS receiver; a cellular telephone broadcast tower triangulation; and Wi-Fi access point location.

12. A computer program product comprising a non-transitory computer readable medium having instructions stored thereon, which, when executed by a processor cause the processor to perform operations comprising:
   receiving, by at least a first computing device, video content information associated with video content, wherein the video content includes one or more video conferences and the first computing device includes a software module configured, at least in part, to access the one or more video conferences, wherein the video content information includes a service provider identifier;
   receiving, by at least a second computing device, end destination information associated with a reception instance of the video content, wherein the end destination information includes experience information that, at least in part, includes information relating to a quality of the reception instance of the video content and a location of an end destination associated with the reception instance of the video content by at least the first computing device used to display the video content, and wherein the received quality of the reception instance of the video content is based upon, at least in part, at least one of detected lost packets and latency associated with the reception instance of the video content by at least the first computing device used to display the video content;
   wherein the video content information associated with the video content and the end destination information associated with the reception instance of the video content is received via one or more messages transmitted by at least the first computing device used to display the video content; and
   selectively aggregating, by at least the second computing device, at least a portion of the video content information and at least a portion of the end destination information, which includes at least a portion of the information relating to the quality of the reception instance of the video content, to generate aggregated information.

13. The computer program product of claim 12, further comprising:
   processing the aggregated information to generate one or more reports.

14. The computer program product of claim 12 wherein the one or more of the first computing device and the second computing device is a mobile media device selected from the group consisting of: a smartphone; a personal media device; a tablet; a personal computer; a mini computer; a laptop; and a personal digital assistant.

15. The computer program product of claim 12 wherein the information relating to a quality of the reception instance of the video content includes one or more of:
   detected latency;
   detected lost packets; and
   a user created comment concerning one or more of the video content and the reception instance of the video content.

16. The computer program product of claim 12 wherein the video content information further includes a video content identifier.

17. The computer program product of claim 12 wherein the location of an end destination associated with the reception instance of the video content includes an end destination location identifier.

18. The computer program product of claim 12 wherein the video content information includes a start time and an end time associated with the video content.

19. The computer program product of claim 13 wherein the one or more reports are configured to provide the aggregated information in a geographically relevant manner.

20. The computer program product of claim 17 wherein the end destination identifier includes one or more of:
   a user input;
   a detected location; and
   an IP address of a network connection.

21. The computer program product of claim 20 wherein the user input includes an address.

22. The computer program product of claim 20 wherein the detected location is detected based upon one or more of: an associated GPS receiver; a cellular telephone broadcast tower triangulation; and Wi-Fi access point location.

23. A system comprising:
   a processor;
   a memory coupled with the processor;
   a first software module executable by the processor and the memory, the first software module configured to receive, by at least a first computing device, video content information associated with video content, wherein the video content includes one or more video conferences and the first software module is further configured, at least in part, to access the one or more video conferences, wherein the video content information includes a service provider identifier;
   a second software module executable by the processor and the memory, the second software module configured to receive, by at least a second computing device, end destination information associated with a reception instance of the video content, wherein the end destination information includes experience information that, at least in part, includes information relating to a quality of the reception instance of the video content and a location of an end destination associated with the reception instance of the video content by at least the first computing device used to display the video content, and wherein the received quality of the reception instance of the video content is based upon, at least in part, at least one of detected lost packets and latency associated with the reception instance of the video content by at least the first computing device used to display the video content;

wherein the video content information associated with the video content and the end destination information associated with the reception instance of the video content is received via one or more messages transmitted by at least the first computing device used to display the video content; and a third software module executable by the processor and the memory, the third software module configured to selectively aggregate, by at least the second computing device, at least a portion of the video content information and at least a portion of the end destination information, which includes at least a portion of the information relating to the quality of the reception instance of the video content, to generate aggregated information.

24. The system of claim 23, further comprising:

processing the aggregated information to generate one or more reports.

* * * * *